(12) United States Patent
Durham

(10) Patent No.: US 7,321,917 B2
(45) Date of Patent: *Jan. 22, 2008

(54) CUSTOMIZING A CLIENT APPLICATION USING AN OPTIONS PAGE STORED ON A SERVER COMPUTER

(75) Inventor: Peter Emmanuel Durham, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 632 days.

This patent is subject to a terminal disclaimer.

(21) Appl. No.: 10/900,641

(22) Filed: Jul. 27, 2004

(65) Prior Publication Data

US 2005/0010647 A1 Jan. 13, 2005

Related U.S. Application Data

(63) Continuation of application No. 09/366,485, filed on Aug. 3, 1999, now Pat. No. 6,810,410.

(51) Int. Cl.
*G06F 15/16* (2006.01)

(52) U.S. Cl. .................. 709/203; 709/219; 715/747

(58) Field of Classification Search ........ 709/200–203, 709/217–227; 715/746–747, 866
See application file for complete search history.

(56) References Cited

U.S. PATENT DOCUMENTS

| | | | |
|---|---|---|---|
| 5,740,549 A | | 4/1998 | Reilly et al. |
| 5,887,139 A | * | 3/1999 | Madison et al. ............. 709/223 |
| 5,974,406 A | * | 10/1999 | Bisdikian et al. .............. 707/1 |
| 6,009,410 A | * | 12/1999 | LeMole et al. ................ 705/14 |
| 6,038,588 A | * | 3/2000 | Nagarajayya et al. ....... 718/102 |
| 6,067,552 A | * | 5/2000 | Yu ........................... 715/501.1 |

(Continued)

OTHER PUBLICATIONS http://my.zdnet.com/myzdnet/alerthelp/, dated Jun. 10, 1999, 2 pages.

*Primary Examiner*—Moustafa Meky
(74) *Attorney, Agent, or Firm*—Klarquist Sparkman, LLP

(57) ABSTRACT

A method and apparatus for displaying an options page for client application in a network environment. Instead of hard coding the options page within the client application, the options page is stored on a server computer and may be updated dynamically without modifying the client application. In one aspect, the user requests to view the options page using menu commands generated by the client application. In response to the user request, the client application launches a browser, if needed, and passes the current settings for the options page to the browser along with an address pointing to the location of the options page on a server computer. The browser connects to the server computer specified in the URL, requests the page associated with the address, and passes the user settings to the server computer. The server computer generates a current version of the options page, initializes the options page by applying the user settings to the options page, and downloads the options page to the browser for display. In another aspect, the user makes changes to the options page in the browser to customize the client application. The browser sends the changes to the server and the server returns the changes to the browser as a special file type. The browser uses a helper function to handle the special file type and launches an application that saves the user settings on the client computer.

29 Claims, 8 Drawing Sheets

U.S. PATENT DOCUMENTS

| | | | |
|---|---|---|---|
| 6,069,623 A * | 5/2000 | Brooks | 715/866 |
| 6,115,039 A * | 9/2000 | Karren et al. | 715/746 |
| 6,121,968 A * | 9/2000 | Arcuri et al. | 715/825 |
| 6,133,915 A * | 10/2000 | Arcuri et al. | 715/779 |
| 6,138,150 A * | 10/2000 | Nichols et al. | 709/219 |
| 6,232,972 B1 * | 5/2001 | Arcuri et al. | 715/815 |
| 6,272,536 B1 | 8/2001 | Van Hoff et al. | |
| 6,278,450 B1 * | 8/2001 | Arcuri et al. | 715/763 |
| 6,384,923 B1 * | 5/2002 | Lahey | 358/1.13 |
| 6,412,008 B1 * | 6/2002 | Fields et al. | 709/228 |
| 6,424,981 B1 | 7/2002 | Isaac et al. | |
| 6,522,342 B1 * | 2/2003 | Gagnon et al. | 715/716 |
| 6,810,410 B1 * | 10/2004 | Durham | 709/203 |
| 7,069,304 B1 * | 6/2006 | Eichstaedt et al. | 709/207 |
| 7,088,990 B1 * | 8/2006 | Isomursu et al. | 455/412.1 |

\* cited by examiner

CUSTOMIZING A CLIENT APPLICATION USING AN OPTIONS PAGE STORED ON A SERVER COMPUTER

CROSS-REFERENCE TO RELATED APPLICATION

This is a continuation of U.S. application Ser. No. 09/366,485, filed Aug. 3, 1999 now U.S. Pat. No. 6,810,410, which is hereby incorporated by reference.

FIELD OF THE INVENTION

The present invention relates generally to graphical user interfaces, and more particularly to displaying and/or saving user options for a client application.

BACKGROUND OF THE INVENTION

Most modern computer software employs a graphical user interface (GUI) to convey information to and receive commands from users. The graphical user interface relies on a variety of graphical user interface elements or objects, including icons, text, drop-down menus, dialog boxes, toolbars, buttons, and the like. A user typically interacts with a graphical user interface by using a pointing device (e.g., a mouse) to position a pointer or cursor over an object and "clicking" on the object. An example of an operating system that provides a graphical user interface is the Microsoft WINDOWS operating system, which is manufactured and sold by Microsoft Corporation of Redmond, Wash.

Drop-down menus are used to organize numerous computer commands into major headings, which are displayed in a menu bar that typically appears along the top of a window. Each heading represents a menu that is displayed when the user clicks on the heading. This menu allows access to numerous commands that are listed in the drop down menu. A user may select a particular command by moving the pointing device to highlight the command and then pressing a mouse button to select the highlighted command. Thus, drop-down menus provide a space-efficient means for organizing and displaying numerous commands.

When a user selects a command from a drop-down menu, a dialog box is typically displayed. The dialog box is more generically called an options page since it provides the user with various options or settings, which are user definable. For example, the options page includes a variety of user interface elements that allow the user to customize or control the application to the user's liking.

Most users are familiar with option pages in client applications. For example, in Microsoft Word, option pages are used to control many aspects of a word processing document, such as the format of paragraphs, the paper size, the margins, etc. With the recent growth of networks, such as the Internet, the ability to accept user options are now becoming familiar for interaction with server computers. In such networking applications, option pages are typically used to allow a user to customize settings of applications stored on the server computer. For example, some Web sites allow each user to customize the content displayed when the user accesses the site. Such customization is implemented through an options page where the user is given options on topics of information (e.g., stocks, sports, travel, etc.) displayed whenever the user accesses the Web site. The user's customization settings may be stored on the client computer or the server computer. Whether stored on the client or server, cookies are typically stored on the client and are passed to the server when the user accesses the site. The server uses the cookies to access the customization settings and displays the customized Web page to the user.

In general, option pages are hard-coded into client applications. Consequently, the option pages cannot be changed without installing a new version of software onto the client computer. For some network-based applications, the hard coding of the option page is problematic. For example, a client application called "News Alert" periodically checks MSNBC.COM for new stories in topics that the user selected. If a new story is available in a selected topic, the client is notified. The user may then view a small abstract of the story and download the entire story, if desired. The set of stories the user can select from in News Alert changes regularly based on hot topics in the news. For example, if a presidential scandal erupts in the news, it is desirable to have an option in an options page that a user can select to view stories for that specific topic. However, with the option page hard-coded, the only way to provide the user with the new option is to download an updated version of the entire News Alert application to the client computer.

Other problems also occur because of the hard coding of option pages. Specifically, the code and resources needed to display the options page substantially increase the size of the client application. A larger client application takes longer for users to download from a server computer and requires more available storage on the client computer. Additionally, it is desirable for the server computer to be able to examine the user settings so that the users may be invited to change the settings based on current activities.

It is desirable, therefore, to provide a system and method wherein user options can be easily updated in a client application.

SUMMARY OF THE INVENTION

A method and apparatus is disclosed that overcomes the shortcomings of prior techniques for displaying option pages for applications running on a client computer. Instead of hard coding the options page within the client application, the options page is stored on a server computer and can be updated dynamically without modifying the client application.

In one aspect, the user requests to view the options page using menu commands displayed by the client application. In response to the user request, the client application launches a browser, if necessary, and passes the current settings for the options page to the browser along with an address pointing to the location of the options page on a server computer. The browser connects to the server computer specified in the URL, requests the page associated with the address, and passes the user settings to the server computer. The server computer generates a current version of the options page, initializes the options page by applying the user settings to the options page, and downloads the initialized options page to the browser for display to the user.

In another aspect, the user can modify the options page to customize the client application. First, the user makes changes to the options page in the browser and selects a "save" button. The browser then sends the changes to the server and the server returns the changes to the browser as a special file type. The browser uses a helper function to handle the special file type and launches an application that saves the user settings on the client computer.

Further features and advantages of the invention will become apparent with reference to the following detailed description and accompanying drawings.

DETAILED DESCRIPTION

Figure 1:
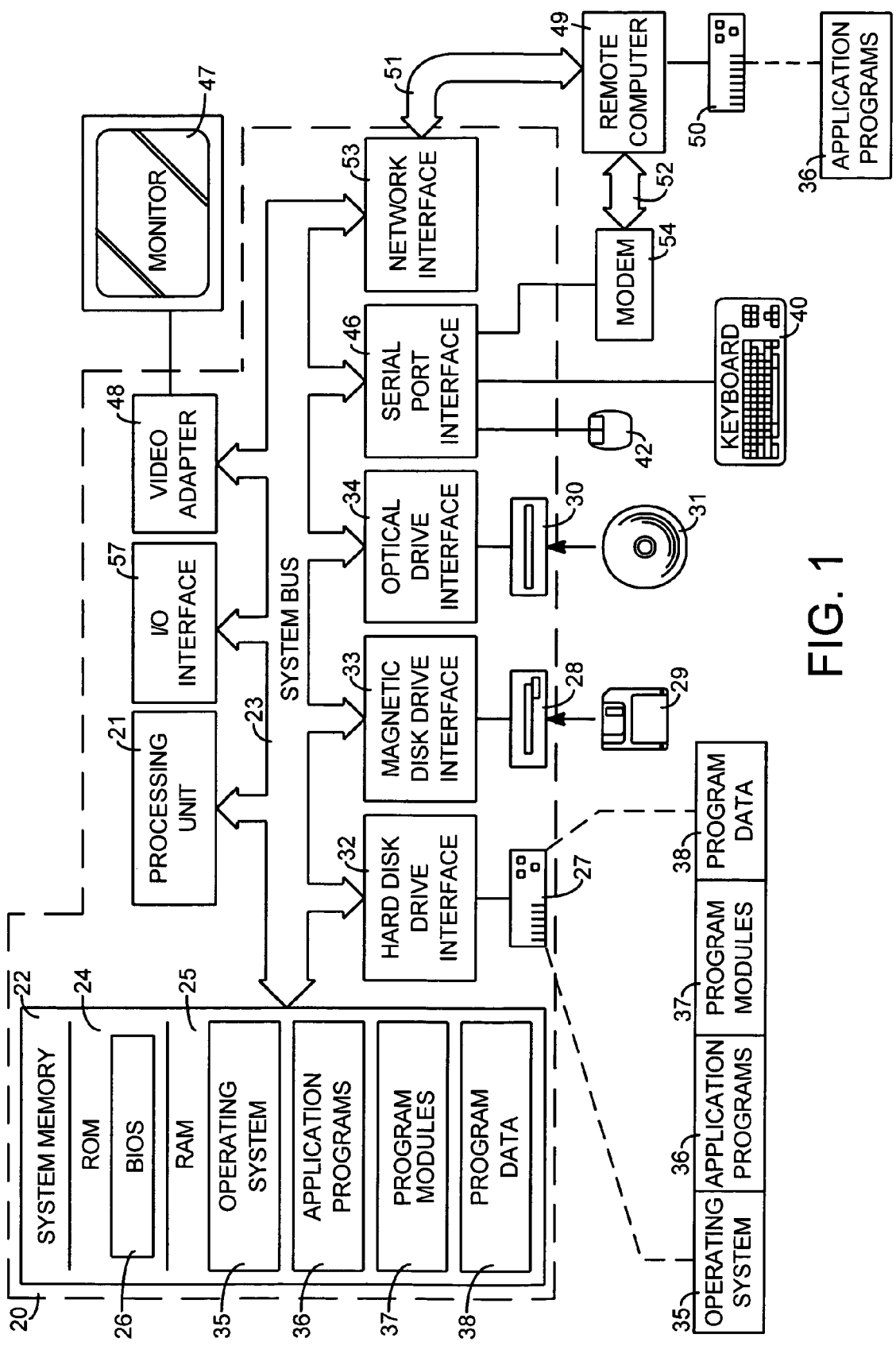
FIG. 1 is a block diagram of a computer system that may be used to implement a method and apparatus according to the invention for displaying an options page for a client application.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routine that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, CDs, DVDs, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42 (such as a mouse). An I/O interface 57 is connected to the system bus 23, thereby allowing input data to be routed to and stored in the RAM 25, or one of the other data storage devices associated with the computer 20. The data can be input into the computer 20 from any of the aforementioned computer-readable media, as well as other input devices (not shown) which may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
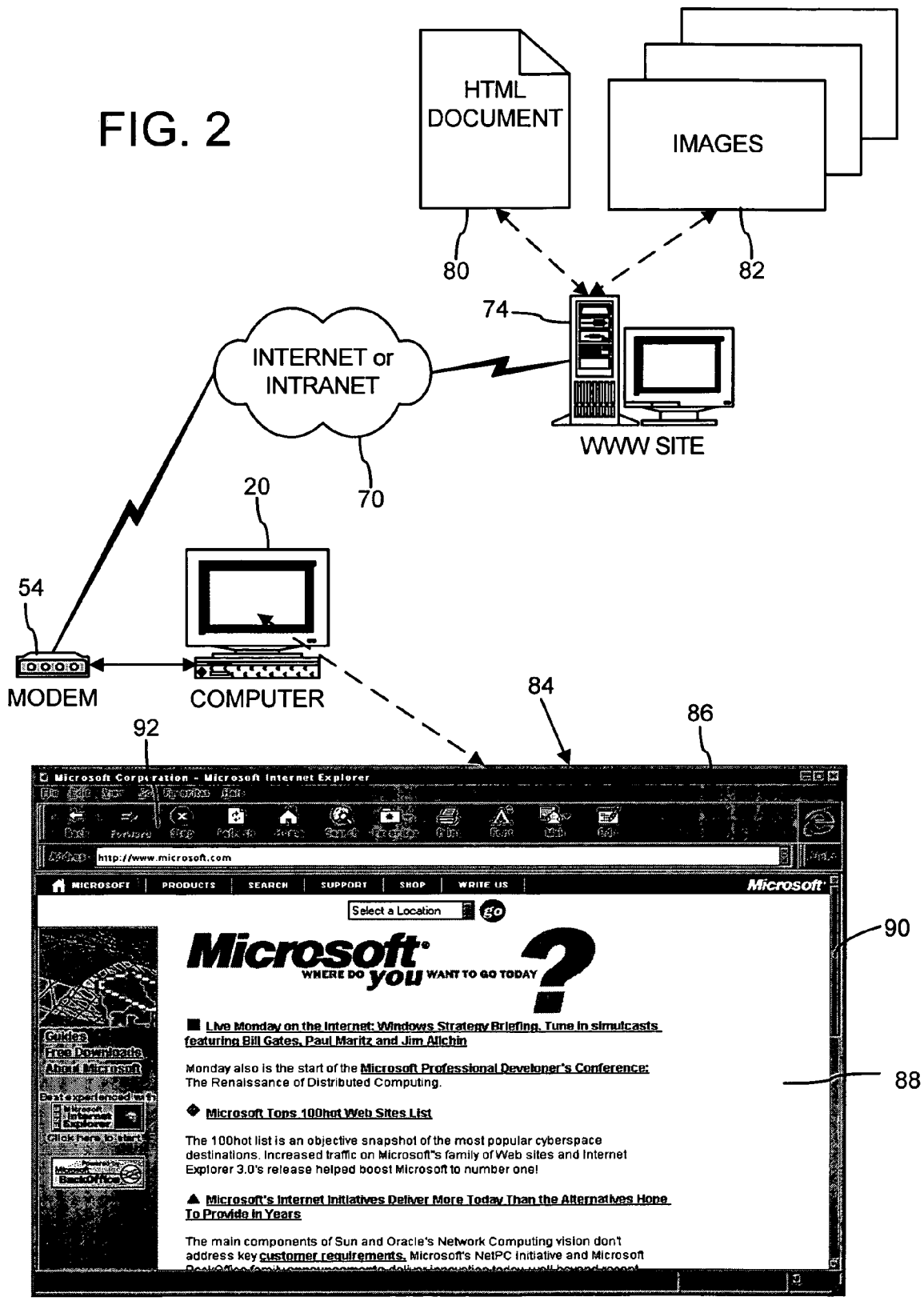
FIG. 2 is a diagram of a browser environment according to an illustrated embodiment.

FIG. 2 shows a particular application for the computer 20 of FIG. 1. Specifically, the computer 20 is connected to the Internet or Intranet, shown generically at 70, using the modem 54. A user typically uses a "browser" (e.g., Microsoft Corporation's Internet Explorer) to access documents and programs available on a remote computer called a server computer 74. In this context, the computer 20 is called a client computer. Typically, documents residing at the server computer 74 are HTML documents, such as document 80, and may include extensions and enhancements of HTML standards. The document 80 is used to display content on the client computer, which may include text, images, audio, video, executable software components, etc. The content may be within the HTML document itself or incorporated therein by using HTML tags that specify the location of files 82 containing content.

An exemplary browser interface 84 displays a document in a window 86 of the computer's display allocated to the browser by the operating system. The illustrated window 86 includes a document display area 88 and user interface controls 90. The browser displays the document within the document display area 88 of the window 84. A browser toolbar 92 is familiar to Internet users and includes a back button, forward button, stop button, etc.

Figure 3:
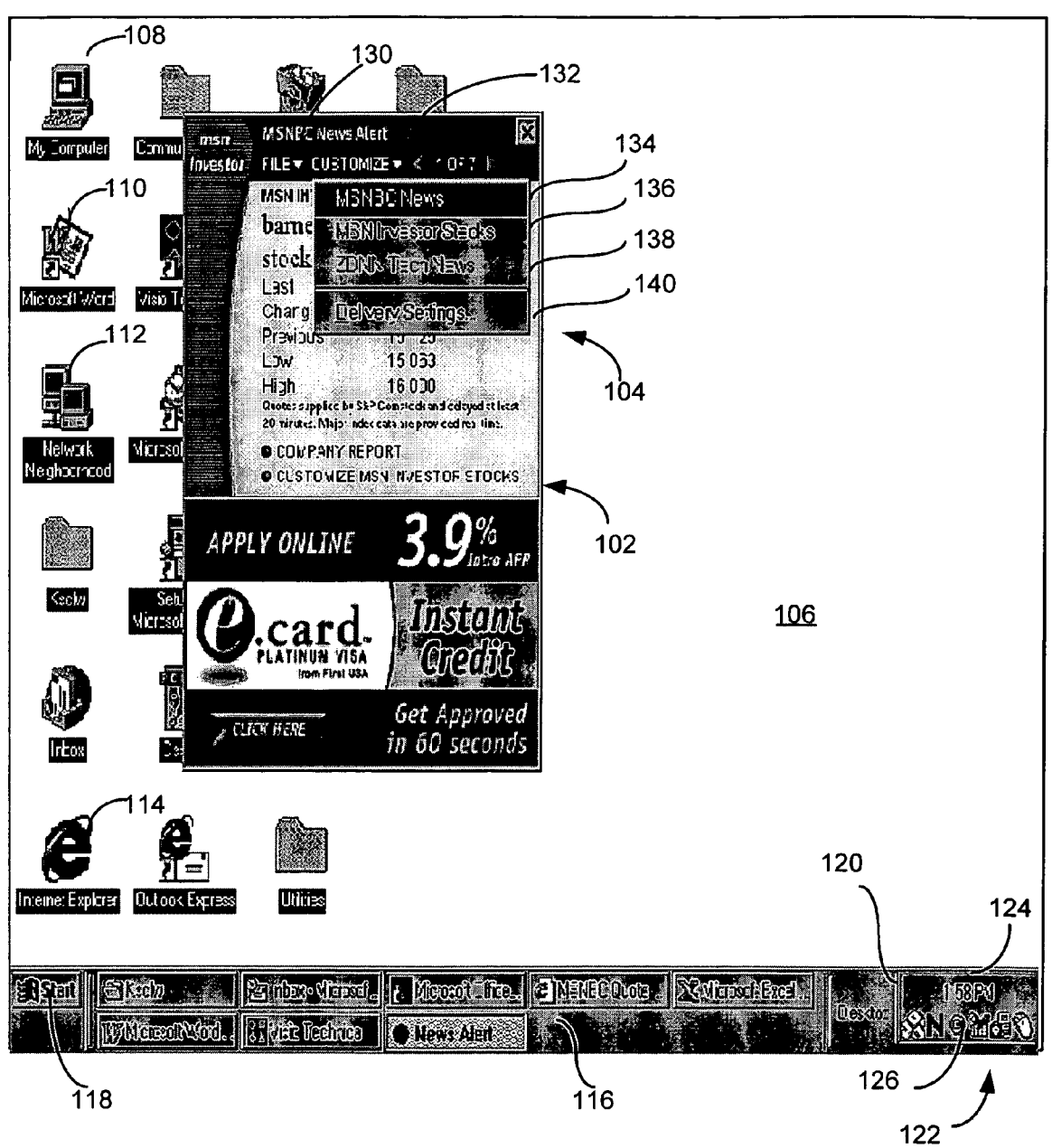
FIG. 3 is a graphical user interface according to the illustrated embodiment including a client application window with a customization drop-down menu selected by a user to display commands for customizing the client application.

Referring to FIG. 3, a known graphical user interface environment 100 (that of the Microsoft Windows NT operating system) is shown. The graphical user interface is displayed on the monitor 47 of computer 20 (FIG. 1). The graphical user interface 100 includes a plurality of windows 102 and 104 overlapping a desktop window 106. The desktop window 106 is a full-screen display containing icons representing programs, files and resources available to the user. As such, the desktop window acts as a launching point for running application programs, opening documents or files, and initiating operating system services. The illustrated desktop window includes desktop icons, such as a "My Computer" icon 108, a "Word" icon 110, "Network Neighborhood" icon 112, an "Internet Explorer" icon 114, etc. The desktop icons displayed are customizable by the user in a well-known fashion.

The desktop window 106 also includes a task bar 116 that extends along the bottom-most portion thereof starting at the left-hand side. The task bar 116 includes a start button 118. Upon clicking the start button 118, a menu (not shown) appears containing user selectable commands, such as for running programs, shutting down the computer, and displaying folders. The task bar also displays icons or buttons representing active applications, such as Visio, Microsoft Word, Excel, etc. Adjacent to the task bar 116 is a desktop toolbar 120 that allows a user to launch applications available on the desktop, without having to minimize all windows on the display. Many of the features shown in FIG. 3 are customizable by the user. For example, the user can choose not to display the desktop toolbar, if desired.

A system tray 122 is positioned at the bottom-right of the display adjacent the desktop toolbar 120. The system tray 122 includes a clock 124 and icons that allow easy access to system configurations, such as the mouse and keyboard, and selected applications. Typically, the applications displayed in the system tray 122 are such that they are always running in the background (i.e., no icon is displayed in the task bar, despite that the application is running) and are launched at startup. An example of such an application is Norton Anti-Virus, which runs in the background and constantly checks for viruses on the system.

Another icon located in the tray 122 that is of particular interest to describing the illustrated embodiment of the present application is a News Alert icon 126. News Alert is a client-based application that periodically checks one or more predetermined server computers on the Internet for new stories that a user on the client computer has expressed interest in. If a new story is available in a selected topic, the client is notified by blinking icon 126. If the user selects the icon 126 using a user input device (e.g., 40 or 42 of FIG. 1), then window 102 is displayed. Although partially obscured by window 104 (which is described further below), the window 102 provides an abstract of the new story. The user may then select window 102 to view the entire story.

The window 102 includes menu buttons 130, 132. If a user selects menu button 130, a menu (not shown) is displayed that allows a user to immediately check for new stories or review the latest stories. If a user selects menu button 132, then window 104 is displayed. Generally, menu button 132 allows a user to customize the stories that the user is alerted to. Window 104 includes four different menu commands. Menu command 134 is an MSNBC news item that allows the user to customize stories received from an MSNBC server computer. Menu command 136 allows the user to customize stock prices that are displayed. Menu command 138 allows the user to customize stories received from ZDNN Technology news, a different server computer than MSNBC. Menu command 140 allows the user to select how often new stories are downloaded and how to alert the user (e.g., sound, flashing icon, etc). The particular menus and commands used may change based on the particular client application.

Customizing the application allows the user to control the behavior of the application. In typical client applications, when a user customizes the client application, an options page (e.g., dialog box) is displayed. For example, in Microsoft Word, the user can right click on the toolbar to display an options page that allows the user to select the toolbars displayed in Word. When any such option pages are displayed, they are either hard-coded within Word or minimally stored on the client computer.

Figure 4:
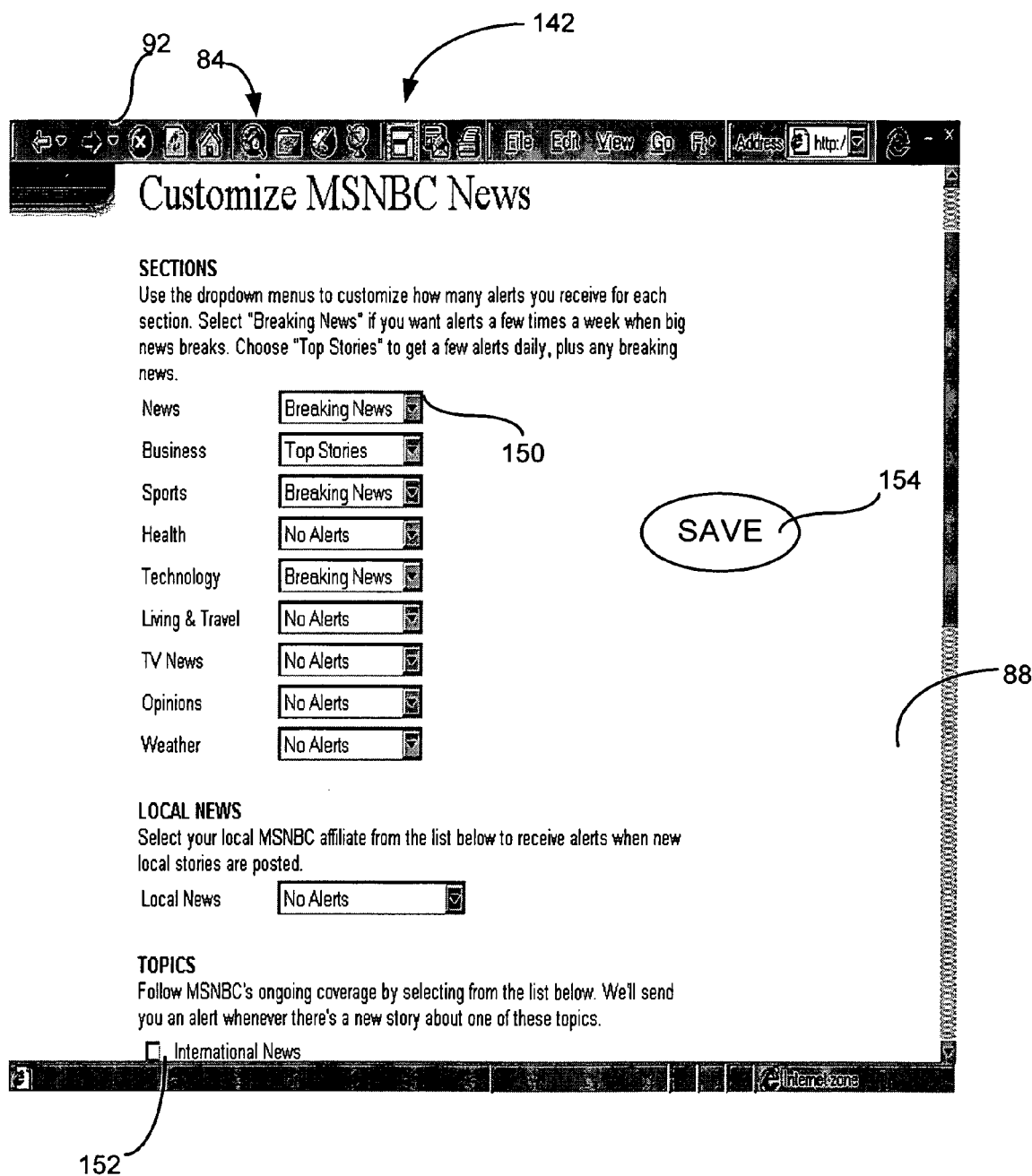
FIG. 4 is an illustration of an options page displayed after the user selects a command from the customization drop-down menu of FIG. 3.

By contrast, FIG. 4 shows an example of an options page 142 that is displayed in a browser interface 84 according to an illustrated embodiment of the present application. The options page 142 is displayed when a user selects the menu command 134 of FIG. 3. Instead of hard coding this options page in the client application, the options page is provided by a server computer, as described further below. Moreover, selecting menu button 134 causes a second, separate and unrelated client application to automatically launch (if the second application is already active, then it is displayed as the currently active window). This second application is generically called a network client and allows a user to communicate to a server computer using a network, such as the Internet and Intranet. For purposes of the present application, the network client is described as a browser. The browser displays the options page 142 for customizing the News Alert client-based application.

Although the browser interface 84 of FIG. 4 appears different than that of FIG. 2, in actuality they are the same interface as revealed by browser toolbar 92 of FIG.4 that includes buttons for back, forward, stop, etc. (i.e., the view of the browser was changed to show more details of the options page). Additionally, although a particular browser is shown, other browsers may be used. The document display area 88 displays the options page for customizing the News Alert client application. The illustrated options page is in HTML format (other formats may be used) and includes user interface elements, such as menu button 150, that allows a user to chose the type of news they wish to receive. Other user interface elements may be used, such as command buttons, radio buttons, check boxes, scroll bars, text fields, etc. The menu buttons relate to various topics such as news, business, sports, health, technology, etc. Check boxes, such as button 152, or radio buttons can be used for topics, such as international news, stock market news, etc. The check boxes (or other user interface elements) may also have hot news topics, such as a "Clinton" box that provides stories about the president. Virtually any topic can be used and the topics are up to date since they are not hard coded within the client application. For example, client software that hard-coded a Clinton box would be out of date in the year 2000 when President Clinton steps down from office. However, the current embodiment of the present application can change the options page instantaneously and dynamically by saving a different version on the server computer. Another section (not shown) of the customize window allows a user to enter key words. If any stories contain these key words then the client computer is alerted to the new story. A save button 154 allows the user to save the customization settings, as is further described below. The customization settings relate to modifying the client application's configuration so that the client application operates or is controlled to operate in a desired fashion from startup.

Figure 5:
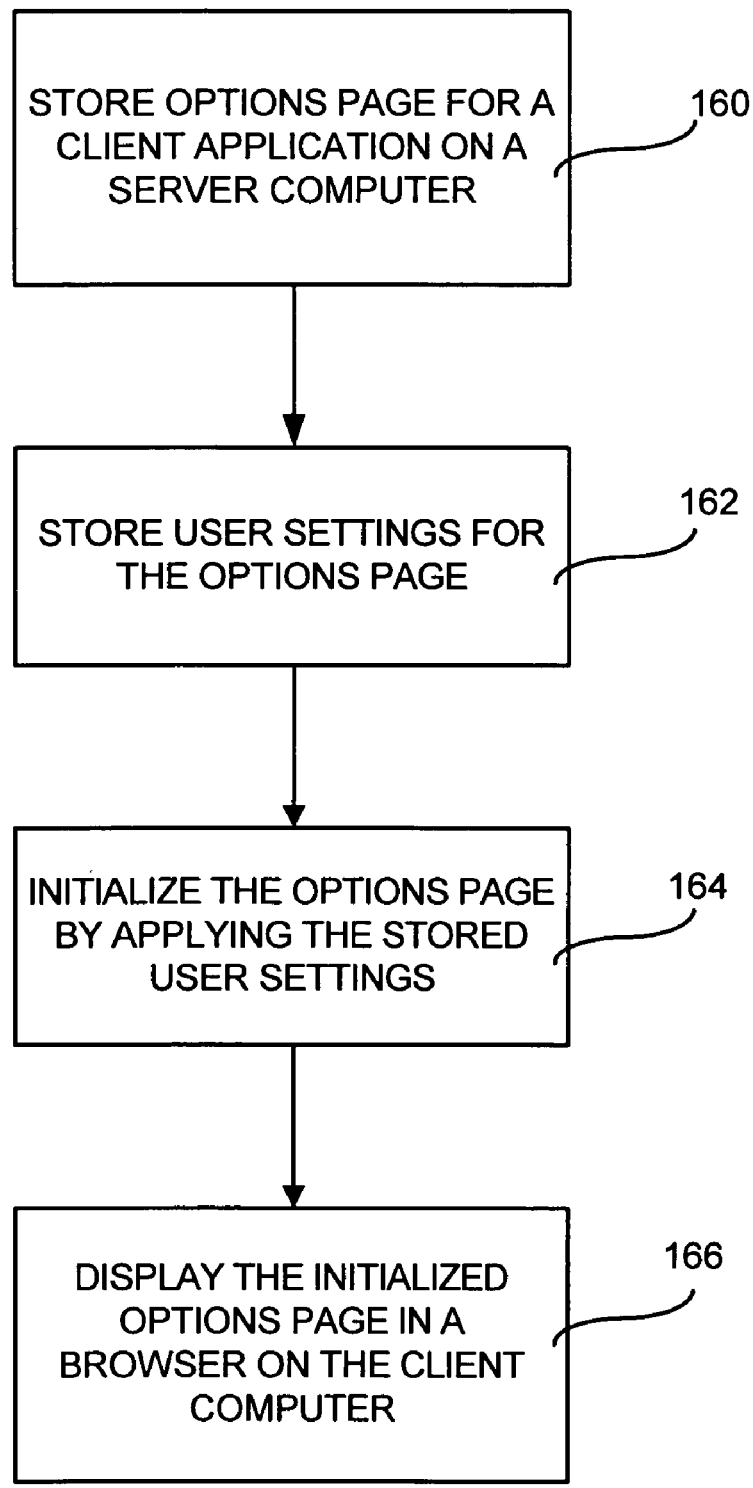
FIG. 5 is a flowchart of a method for displaying the options page of FIG. 4.

FIG. 5 shows a flowchart of acts used according to the illustrated embodiment of the present application. Act 160 illustrates that a server computer stores an options page associated with a client application, such as options page 142 of FIG. 4, which is used for the News Alert client application. However, this options page is a template and does not contain the specific user settings. Additionally, the server-side options page can change without the need to change the client application it is associated with. The server-side options page can be a saved form, such as an HTML form, or a program (e.g., Visual Basic script) that generates the options page. Act 162 shows that the user settings for the options page are stored to display a customized options page to the user. In the illustrated embodiment (as described further below), the user settings are stored on the client computer. However, the user settings may also be stored on the server computer, if desired. Act 164 illustrates that the options page stored on the server computer is initialized using the stored user settings. In the case where the options page is a stored HTML form, the initialization means the user settings are applied to the various fields of the form. Where the options page is a program (e.g., VB Script), the initialization means the user settings are applied as a parameter to the program and the program is executed to generate the form. Act 166 shows that the initialized options page is displayed on the browser of the client computer.

Figure 6:
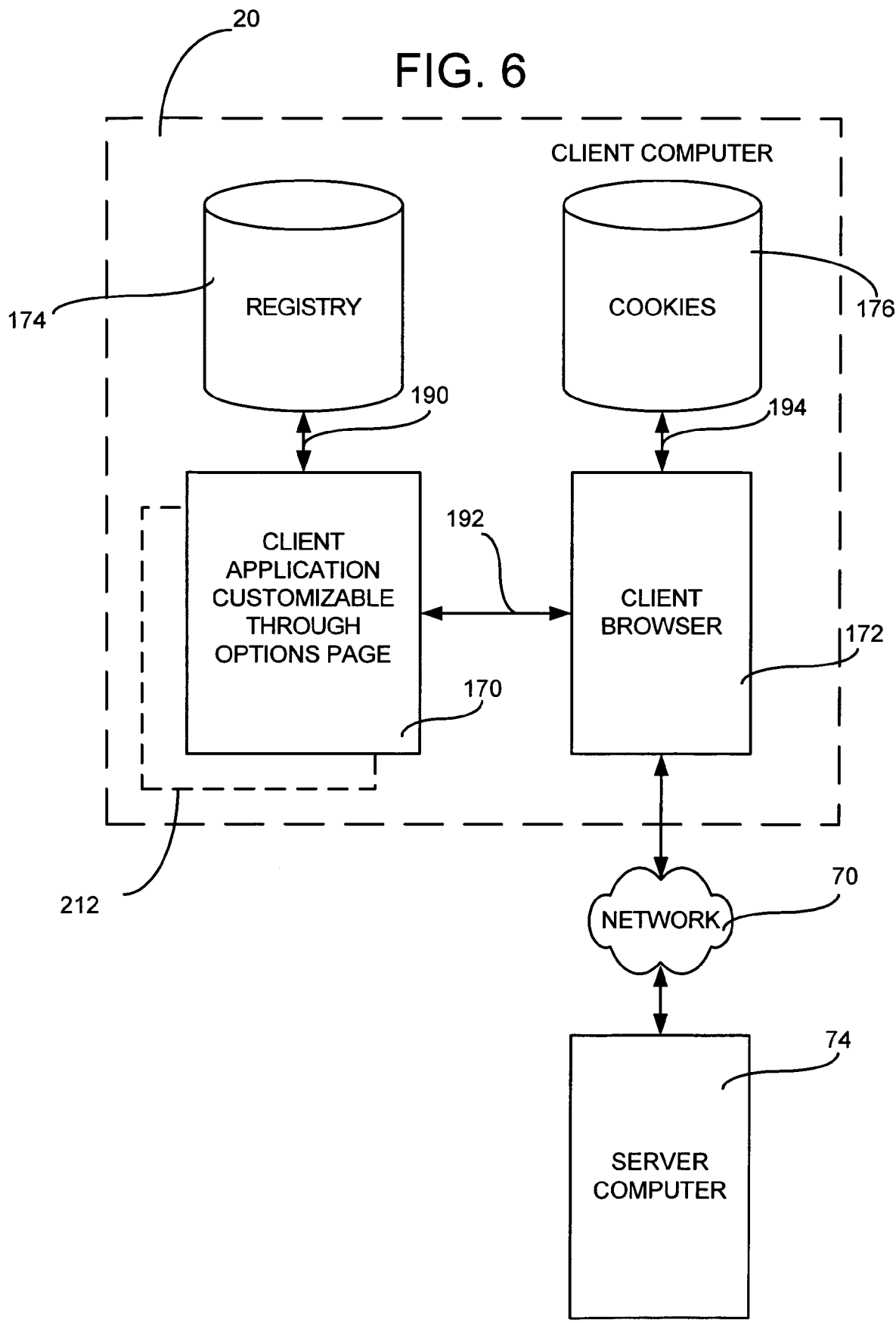
FIG. 6 is a block diagram of an illustrated system for displaying the options page of FIG. 4.
Figure 7:
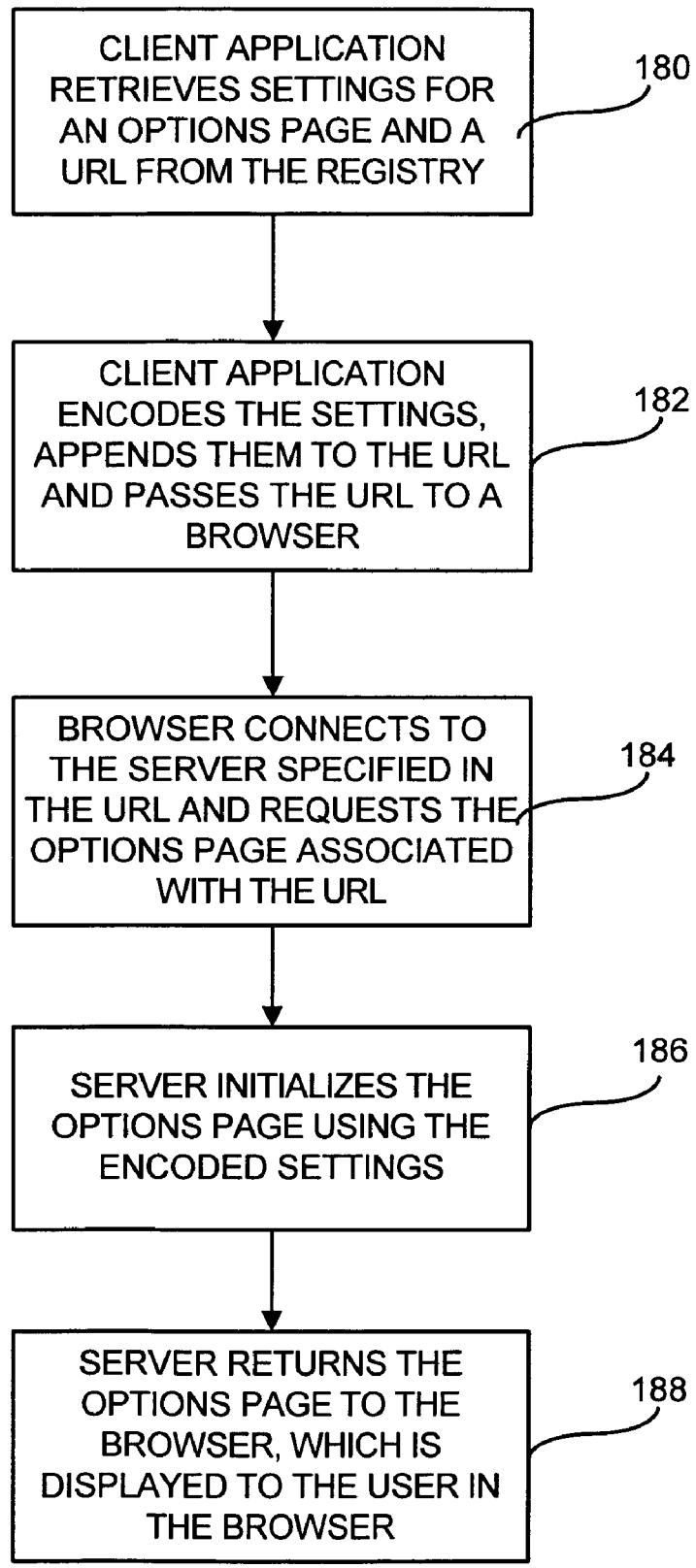
FIG. 7 is a detailed flowchart of a method for displaying the options page of FIG. 4.
Figure 8:
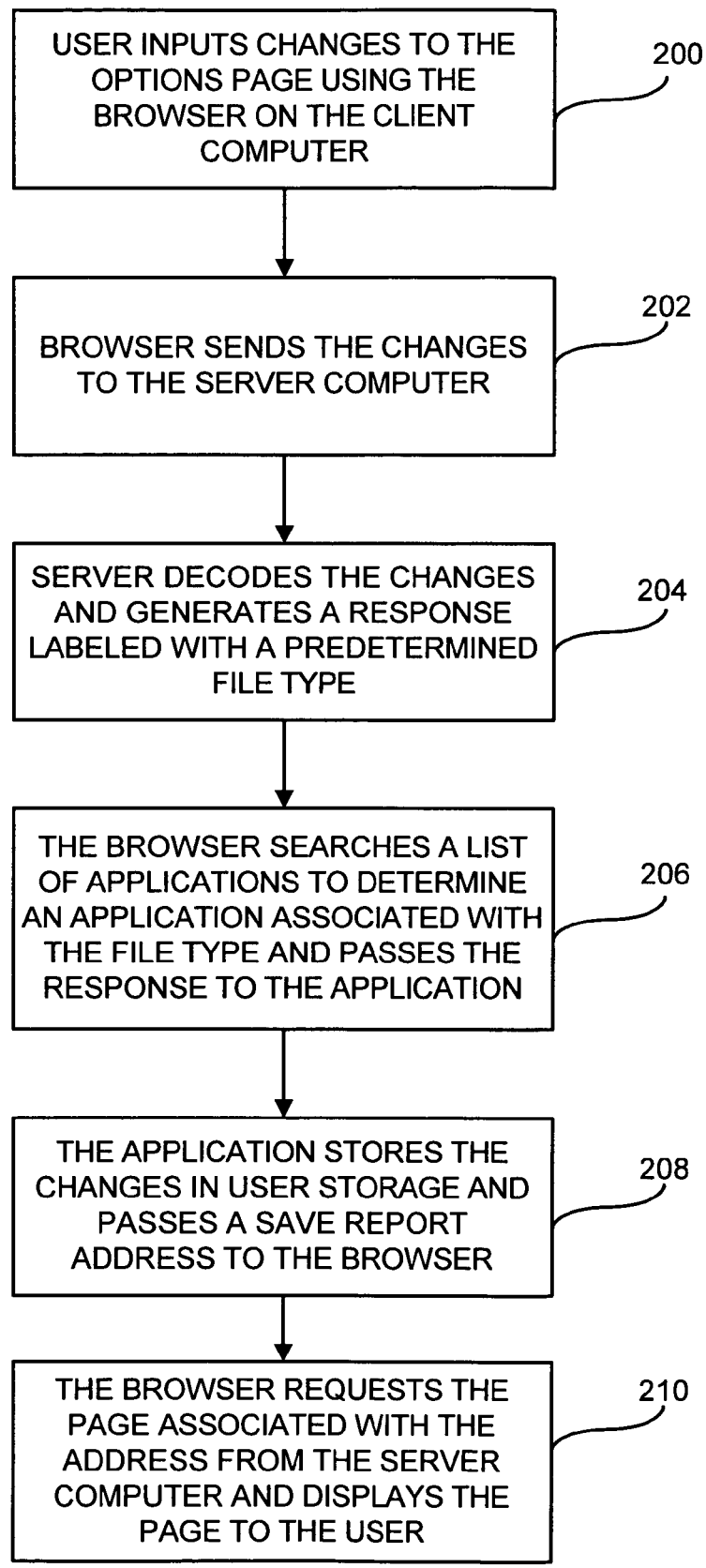
FIG. 8 is a detailed flowchart of a method for customizing the options page of FIG. 4.

FIGS. 6, 7 and 8 show a detailed implementation of the illustrated embodiment. FIG. 6 shows the interaction between system components used to implement the illustrated embodiment. FIGS. 7 and 8 show a detailed diagram of acts performed according to the illustrated embodiment and are described with reference to the components of FIG. 6.

Starting with FIG. 6, the client computer 20 is shown with at least two client applications. One client application 170 is an application that is customizable using an options page according to the invention. A second client application 172 is an application specifically designed for allowing a user to interact with a network. An example of the second client application is a browser that enables a user to view HTML documents on the World Wide Web, another network, or the client computer itself. The browser also allows the user to select hyperlinks to retrieve other documents from server computers on the network. Most browsers can also handle IP packets, display graphics that are in a document, play audio and video files and execute small programs, such as Java applets or ActiveX controls, that can be embedded in HTML documents.

Client application 170 retrieves and stores information in a storage area on the client computer 20 called a registry 174. The registry is a central hierarchical database used to store information necessary to configure the system for one or more users, applications, and hardware devices. The registry was first introduced in Microsoft Corporation's Win32 application program interface (API) and contains information that supports shell applications (such as Windows File Manager) and applications that use Microsoft Corporation's Object Linking and Embedding (OLE) technologies. Each piece of information in the registry is identified by a key (not shown) which may have a value (data) associated with it.

The Windows® operating system includes a set of functions (not shown) to support querying and setting information in the registry. The registry also provides a source for configuration information and enumerates and tracks applications, device drivers, and operating system control parameters. For a detailed discussion of the registry, see Win32 Programmers Reference, Vol. 2, published by Microsoft Press, Redmond, Wash. (1993). Other storage locations on the client computer 20 can be used in place of the registry 174, such as system memory 22 or secondary storage. In these locations, the storage may be in the form of a text file.

The browser retrieves and stores cookies from a cookie storage 176. Like storage 174, the cookie storage can take a wide variety of forms including, the registry, memory 22 or secondary storage. Cookies are a block of data that a server computer requests the browser to store. When a user returns to the same Web site, the browser sends a copy of the cookie back to the server. Cookies are typically used to identify users, to instruct the server computer to send a customized version of the requested Web document, to submit account information, etc. The browser 172 communicates with the server 74 through the network interconnection 70, as already described.

FIG. 7 shows a method for displaying an options page within a browser, wherein the options page is for customizing a client application. As a first act 180, the client application 170 retrieves the user settings (assuming the user settings were previously stored) for an options page and retrieves a URL from the registry 174 as shown by arrow 190 (FIG. 6). The URL is an address identifying the location of the options page on a server computer. The client application 170 then encodes the settings and appends the encoding to the options page URL.

An example URL with an appended encoding is as follows: http://www.msnbc.com/tools/newsalerUmsnbc.asp?s=022222000000000200220000&I =KING&t=00010101111&k=Microsoft|Argentin*|

The section "http://www.msnbc.com/tools/newsalert/msnbc.asp" is a URL for an options page located on an MSNBC server computer.

The question mark (?) is a URL separator wherein a web page address comes before it and a query string (data) comes thereafter.

The data section is indicated by "s=022222000000000200220000," which describes the state of each of the user interface elements (e.g., menu 150) shown in FIG. 4. The list is zero-based wherein section 0 is default for unrecognized sections, section 1 is News, section 2 is Business, etc.

The "&" symbol is a URL data separator. The section "l=KING" is a setting for the local news settings wherein it specifies call letters of a selected affiliate.

The second "&" is another URL data separator. The section "t=00010101111" is an encoding of the topics section. The list is zero-based, and topic 0 is default for unrecognized topics, topic 3 is International news, etc. A "0" means not selected and a "1" means selected.

The third "&" is another URL data separator. The section "k=Microsoft|Argentin*|" are keywords settings wherein keywords are separated by | character. Although not shown in FIG. 4, the options page includes a section where key words may be entered by a user so that news stories containing the key words are delivered to the user. Although a specific encoding is illustrated, other encoding techniques may be used. Additionally, the encoding changes in correspondence with the user interface elements that are available on the options page.

This encoded URL is passed (act 182) through a Windows shell API call, ShellExecute, to the client browser 172 as indicated at 192 (FIG. 6). Other techniques may also be used to pass the encoded URL to the browser, such as an ActiveX control or other techniques well known in the art. The browser 172 then retrieves any cookies associated with the URL that have been stored in storage 176 as indicated at 194 (FIG. 6). Act 182 may also include the automatic launching of the client browser application 172 prior to passing the URL to the browser. In act 184, the client browser automatically connects to the server computer specified in the URL and requests the options page associated with the URL by passing the encoded URL to the server computer 74. In step 186, the server decodes the appended user settings of the URL and uses the user settings to initialize the options page. Act 188 shows that the server 74 returns the options page to the browser 172. The browser 172 then displays the customized options page to the user.

Storing the user settings in the cookie storage provides several advantages. For example, if client application 170 is not active, the user can still make changes to the options page. To accomplish this, the user accesses the options page directly on the server computer using a browser. The server obtains the user settings through the cookie and updates the user settings on the client computer using the special-file-type technique described below. Another advantage is that stories on web pages may include invitations for users to update their client options page to include a topic corresponding to the story. When the user selects the invitation, the browser retrieves a page where the cookie is checked. If the user has the client application 170 already installed, their settings are updated automatically. If the user does not have the client application installed, then the user is prompted to download a copy of the client application.

FIG. 8 illustrates a method of saving new user choices for the options page, so that next time the user views the options page, their saved choices are displayed, thereby customizing the options page for the user.

In act 200, the user inputs changes to the options page 142 using the browser on the client computer 20. Returning briefly to FIG. 4, the user can change settings on the options page 142 by using menu buttons (e.g., menu button 150), check boxes (e.g., box 152), text fields, and other available user interface elements (not shown). When the user finishes making changes, the "Save" button 154 is selected using a user-input device. After the save button is selected, act 202 illustrates that the browser sends the changes to the server computer 74. In particular, the browser submits an HTTP encoding of the choices selected by the user in the options page, as is well understood in the art. Next, the server computer 74 decodes the user changes and generates a response with a predetermined file type (act 204). MIME file types or other file types can be used. MIME (Multipurpose Internet Mail Extensions) is a standard that extends the Simple Mail Transfer Protocol (SMTP) to permit data, such as video, sound, and binary files to be transmitted by Internet e-mail without having to be translated into ASCII format first. A MIME compliant application sending a file assigns a MIME type to the file. The receiving application refers to a standardized list of documents that are organized into MIME types and subtypes to interpret the content of the file. For example, one MIME type is text, and it has a number of subtypes including plain and HTML. In the particular situation where the client application 170 is News Alert application, then the MIME type "application/x-MSNBC-News-Alert" is used.

The response generated by act 204 contains two instances of the user's settings. The header of the response contains instructions to the browser to apply the settings to the cookie store. The content of the response is a MIME file that contains the user's settings to be applied to the registry. The MIME file also contains a URL of a page to display for reporting that the changes the user requested have been saved. The server computer 74 sends the MIME file to the client browser 172 over the network 70. Upon receiving the MIME file, the client browser 172 saves the cookie changes as indicated at 194 (FIG. 6). Act 206 illustrates that the browser does not recognize how to display a response of the MIME type indicated (e.g., application/x-MSNBC-News-Alert). Consequently, the browser reviews a list of helper applications to determine which application the response should be forwarded to. A helper application is an application launched by a browser when the browser downloads a file that it is unable to process itself. At installation of client 170, a helper application is registered for the special file type. The helper function directs the browser to launch a new instance of the client application. For example, continuing with the News Alert example, a helper application is registered for the file type "application/x-MSNBC-News-Alert." Thus, when the browser receives the MIME-type response, it reviews the helper functions for a function having a matching type. In response to information in the matching helper function, the browser 172 launches a second instance 212 (FIG. 6) of the client application 170. The browser also passes a name of a temporary file (not shown) containing the response to the second instance of the client application. This second instance of the client application is hidden to the user and is only temporary. The second instance 212 reads the temporary file and saves the changes of the user settings in the registry 174. Additionally, the temporary file contains a URL of a save report. This URL is passed by the second instance 212 to the browser 172. The browser 172 uses the URL to request the "save acknowledge" page from the server 74. In response, the server 74 passes the save acknowledge page to the browser 172. The browser then displays the page to indicate to the user that the save has been completed. Finally, the second instance 212 passes to the first instance 170 a request to read the new settings from the registry and then update the information presented to the user accordingly.

Having described and illustrated the principles of my invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

For example, although the user settings are described as being stored on the client computer, they may be stored on the server computer as well. In such a case, a user identification, such as a GUID, is used as a key to accessing the user settings.

Additionally, although the initialization of the options page is described as occurring on the server computer, the options page may be initialized on the client computer. In one such case, a control is placed on the Web page associated with the URL. The control obtains the user settings from storage on the client computer and uses the user settings to initialize the options page. In another case, the page may contain scripting code run on the client to initialize the options based on cookie values.

Furthermore, although the options page is described as being located primarily on a single server computer, different option pages can be set up for different channels. The address for the options page for a particular channel is located in a channel file. Thus, different option pages are located on different server computers. Additional channels can be added by downloading additional channel files. Each channel is given a unique ID. This ID is used as an index to the settings stored in the registry.

Yet still further, although the client application 170 is described as retrieving the user settings from the registry, the browser may retrieve these settings instead. This is accomplished by using a control on the options page that retrieves the user settings.

Still further, although the URL of the options page is described as being stored in the registry, it can be coded into the client application 170.

Although the present application uses News Alert as a client application 170 for illustrative purposes, other client applications can be used instead. Thus, any desired client application may have an options page displayed in a separate client browser. Accordingly, the client application does not require any particular features of News Alert. For example, an icon related to the client application does not need to be displayed in the system tray.

Yet still further, although a particular technique for storing changes a user makes to the options page is described, different techniques may be used. For example, a control can be provided that is located on the options page and that saves the user settings on the client computer when the user selects the save button.

In view of the many possible embodiments to which the principles of my invention may be applied, it should be recognized that the detailed embodiments are illustrative only and should not be taken as limiting the scope of my invention. Rather, I claim all such embodiments as may come within the scope of the following claims and equivalents thereto.

I claim:

1. A system for displaying an options page for a client application on a client computer, the client computer comprising a web browser and connected via a network to a server computer, the system comprising a client application configured to:

store a URL for an options page located on the server computer; and
store user settings for the client application; and
wherein the client application is configured to perform the following steps in response to a user request for access to an options page:
retrieving the URL and the user settings;
appending an encoded version of the retrieved user settings to the retrieved URL to create a options page URL containing settings; and
passing the options page URL containing settings to the web browser to cause the web browser to open the options page.

2. The system of claim 1, wherein the client application is further configured, in response to being passed a file containing modified user settings for the client application, to store the modified user settings.

3. The system of claim 2, wherein the client application is configured to store the modified user settings in response to being passed a file containing modified user settings without requiring action by the user.

4. The system of claim 2, wherein the client application is configured to store the user settings on the client computer.

5. The system of claim 4, wherein the client application is configured to store user settings in a cookie on the client computer.

6. The system of claim 4, wherein the client application is configured to store user settings and the URL for an options page in a registry.

7. The system of claim 2, wherein the client application is configured to store the user settings on the server computer.

8. The system of claim 1, wherein the client application is configured to display a set of menu items that allow a user to request access to an options page.

9. A system for creating on a server computer an options page for a client application on a client computer to be displayed through a web browser on the client computer, the server computer and client computer connected via a network, the system comprising a web page server application configured to perform the following steps:
receiving a URL for an options page for the client application from the web browser on the client computer via the network, the URL partially comprising encoded settings for the client application;
creating an options page for the client application;
decoding the settings from the URL;
initializing the options page for the client application using the decoded settings; and
sending the initialized options page to the web browser from which the URL was received.

10. The system of claim 9, wherein the web page server application is configured to create an options page from an options page template which does not contain settings for the client application.

11. The system of claim 10, wherein the template can be modified without modifying the client application.

12. A system utilizing a server computer for modifying options on a client application located on a client computer connected to the server computer via a network, the system comprising a server application configured to perform the steps of:
sending an options page for the client application to a web browser on the client computer, the options page comprising options choices for selection by a user;
receiving via the network an encoding of choices selected by the user from the options page, the choices representing settings for the client application;

decoding the encoded choices to determine settings selected by the user;

generating a response comprising the decoded choices, the response configured to allow an application on the client computer to store the selected settings for the client application.

13. The system of claim 12, wherein the client application is configured to generate a response of a MIME file type.

14. The system of claim 12, wherein the response at least in part comprises instructions to a web browser on a client computer to apply the selected settings to a stored copy of settings for the client application in a cookie.

15. The system of claim 12, wherein the response at least in part comprises selected settings to be applied to a registry on the client computer.

16. One or more computer-readable media containing instructions which, when executed, cause a client computer to perform a method for displaying an options page for a client application, the method comprising:

receiving a user request for access to an options page;

retrieving user settings;

retrieving a URL stored on the client computer, the URL describing a location of an options page stored on a server computer;

appending an encoded version of the retrieved user settings to the retrieved URL to create a URL containing settings; and passing the URL containing settings to a web browser to cause the web browser to open the options page.

17. The one or more computer-readable media of claim 16, wherein the user settings are stored on the server computer described in the URL.

18. The one or more computer-readable media of claim 16, wherein the user settings are stored on the client computer.

19. The one or more computer-readable media of claim 18, further containing instructions which, when executed, cause the client computer to perform a method comprising:

storing a URL describing a location of an options page stored on the server computer; and storing user settings for the client application.

20. The one or more computer-readable media of claim 18, wherein the user settings stored on the client computer are stored in a cookie.

21. The one or more computer-readable media of claim 18, wherein the user settings stored on the client computer are stored in a registry.

22. The one or more computer-readable media of claim 16, where the URL stored on the client computer is stored in a registry.

23. The one or more computer-readable media of claim 16, wherein the method for displaying an options page further comprises displaying a set of menu items that allow the user to request access to an options page.

24. The one or more computer-readable media of claim 16, further containing instructions which, when executed, cause the client computer, in response to being passed a file containing modified user settings for the client application, to store the modified user settings without requiring action by the user.

25. One or more computer-readable media containing instructions which, when executed, cause a server computer to perform a method for creating an options page for a client application on a client computer, the method comprising:

receiving a URL for an options page for the client application from the client computer;

creating an options page for the client application comprising options choices for selection by the user;

sending the options page to the client computer;

receiving an encoding of choices selected by the user via the network, the choices representing settings for the client application;

decoding the encoded choices to determine settings selected by the user; and generating a response comprising the decoded choices, the response configured to allow an application on the client computer to store the selected settings for the client application.

26. The one or more computer-readable media of claim 25, wherein the URL partially comprises encoded settings for the client application, and wherein the method for creating an options page for the client application further comprises:

decoding the settings from the URL; and initializing the options page for the client application using the decoded settings before sending the options page to the client computer.

27. The one or more computer-readable media of claim 25, wherein the response has a MIME file type.

28. The one or more computer-readable media of claim 25 wherein the response at least in part comprises instructions to a web browser on the client computer to apply the selected settings to a copy of settings for the client application stored in a cookie.

29. The one or more computer-readable media of claim 25, wherein the response at least in part comprises selected settings to be applied to a registry on the client computer.

* * * * *